United States Patent [19]

Taguchi et al.

[11] 4,096,499
[45] Jun. 20, 1978

[54] MIRROR SUPPORTING BODY AT A SINGLE LENS REFLEX CAMERA

[75] Inventors: Tatsuya Taguchi, Tokyo; Nobuaki Date, Kawasaki, both of Japan

[73] Assignee: Canon Kabushiki Kaisha, Tokyo, Japan

[21] Appl. No.: 714,563

[22] Filed: Aug. 16, 1976

[30] Foreign Application Priority Data

Aug. 22, 1975 Japan .................... 50-101861

[51] Int. Cl.$^2$ ............................................. G03B 19/12
[52] U.S. Cl. ..................................... 354/152; 354/150
[58] Field of Search ............... 354/152, 153, 154, 155, 354/156, 158, 157, 150; 350/288, 308–310

[56] References Cited

U.S. PATENT DOCUMENTS

| 713,629 | 11/1902 | Garfield | 354/152 |
|---|---|---|---|
| 2,949,073 | 8/1960 | Weiss | 354/155 |
| 3,257,922 | 6/1966 | Maitani | 354/156 |
| 3,427,945 | 2/1969 | Ettischer | 354/156 |
| 3,468,232 | 9/1969 | Knapp | 354/156 |

FOREIGN PATENT DOCUMENTS

| 912,954 | 2/1946 | France | 354/152 |
|---|---|---|---|
| 50,420 | 3/1966 | Germany | 354/155 |

*Primary Examiner*—Edna M. O'Connor
*Attorney, Agent, or Firm*—Toren, McGeady and Stanger

[57] ABSTRACT

In a reflex camera a mirror support is composed of a base with flexible members and arms carried by the base. Each arm has one end bendable to position the mirror on the base, while the other end forms a stop to restrict movement of the mirror. The arms also have axle bearing support for positioning the base relative to the light path and the reflective plane of the mirror. The flexible members of the base are adhesively coated for holding the mirror in position relative to the light path.

3 Claims, 4 Drawing Figures

MIRROR SUPPORTING BODY AT A SINGLE LENS REFLEX CAMERA

The present invention relates to a supporting body of a movable mirror at a single lens reflex camera.

A movable mirror of a single lens reflex camera is placed at a position being slanted with an angle of 45° against the optical axis of a photographing lens within the optical path in the rear of the photographing lens, as being well known, and the light beam penetrating through said lens is reflected at the surface of the mirror to have the same imaged on a focusing plate placed at a position conjugate with a film plane, while said mirror is rotated around the axle in an association with a shutter button at a time of photographing and is evacuated to outside of the photographing optical path. Therefore, unless the reflective plane of the mirror is kept at a proper position against the focusing plate and the film plane, a good picture with satisfactory focusing can not be obtained.

Heretofore such movable mirror is usually retained in place by having its reverse plane cemented with a supporting plate which is rotatable around the axle, and in some cases it is further pressure contacted with the supporting plate by a leaf spring, etc. to prevent it from being peeled off by a shock of movement.

Also said supporting plate is usually retained at a reflective position by having its reverse plane contact with a stopping member within a camera. In such set up the thickness from the reverse plane of the supporting plate to the reflective plane of the mirror and parallelness therebetween will become irregular or inaccurate by uneven thickness of the mirror itself or irregularity of the thickness of adhesive layer, etc. said adhesive will have ageing by the effect of the pressure of said spring or such environmental condition as temperature and humidity, etc., which causes the inclination angle of the mirror and the flatness thereof to be out of order.

It is an object of the present invention to eliminate said shortcomings and to provide a supporting body which can retain the reflective plane of a mirror at a proper position with a very simple structure. For that end, in the present invention a plane to receive the reflective plane of a mirror, holes to have a rotating axle fitted therein-through, and members to engage with a stopping member of a camera are provided integrally at a mirror supporting body.

Now, the present invention will be explained in detail referring to an example and drawings.

Figure 1:
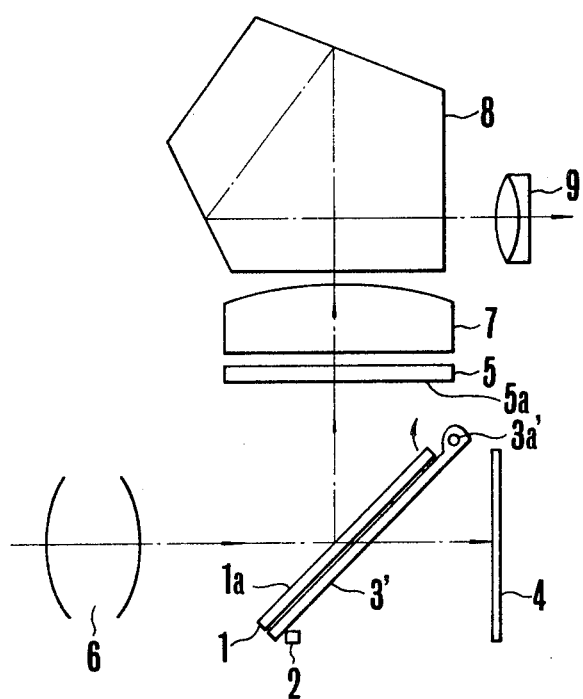
FIG. 1 is an optical path diagram of a single lens reflex camera having a conventional mirror supporting body built therein.

In FIG. 1, what is shown as 6 is a photographing lens, and what is shown as 1 is a reflective mirror, while a mirror supporting body is shown as 3', and is provided in a rotatable manner around an axle 3'a, wherein the reverse plane of said supporting body comes in contact with a stopping member 2 provided at a camera and is pressed by springs to retain the mirror at a position being slanted with an angle of 45° against the optical axis. The adhesive will have an aging effect due to the pressure.

The light beam penetrating through the lens 6 is reflected at the surface 1a of the mirror and is imaged at a focusing plane 5a of a focusing plate 5, then it proceeds through a condensor lens 7, a pentagonal prism 8, and a finder eye-piece 9, and reaches an eye of a photographer. A photographer makes focus adjusting while observing an object image on the focusing plate, then presses a shutter button, thus the mirror supporting body 3' rotates to a direction of an arrow mark around the axle 3'a to have the mirror 1 evacuated to outside of photographing optical path by a conventional method, so that the light beam from the lens 6 is imaged at the surface of a film 4.

Figure 2:
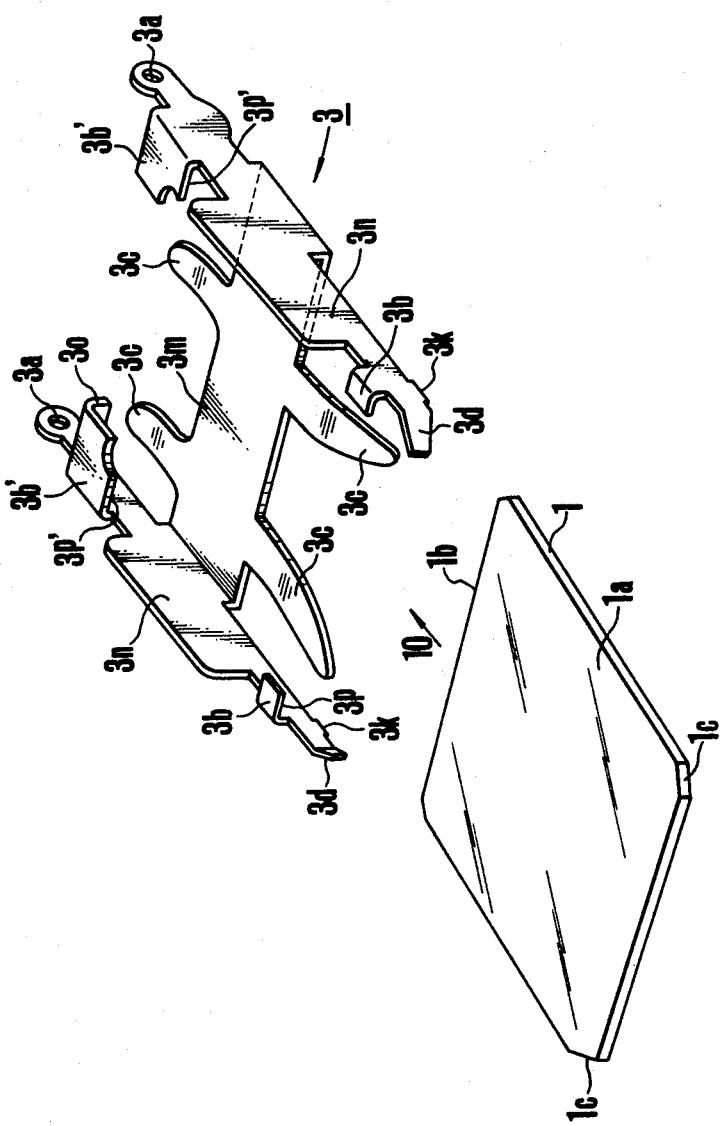
FIG. 2 is an oblique view to show an example of a mirror supporting body according to the present invention.
Figure 3:
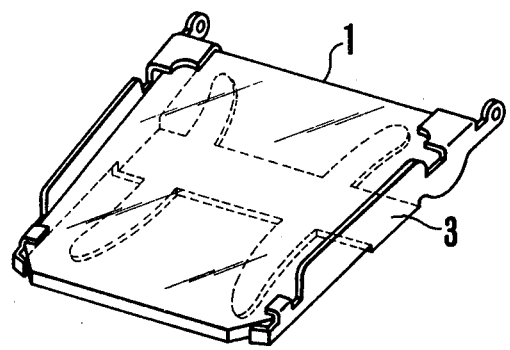
FIG. 3 is an oblique view to show at state of a mirror being fitted in the mirror supporting body shown in FIG. 2.
Figure 4:
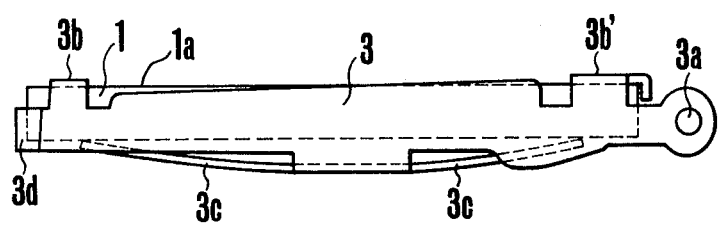
FIG. 4 is a side elevation of FIG. 3.

In the example shown in FIG. 2 on, what is shown as 3 is a mirror supporting body made by pressing and forming a relatively thin metal plate having elasticity, in which two arms 3n having axle holes 3a are provided at both ends of a base plate 3m in such a manner as opposing to each other and as sandwiching the sides of the mirror 1, and bent parts 3b, 3b' having defining planes 3p, 3 p' which contact the reflective plane 1a of the mirror are provided at each arm 3n. The bent part 3b' further has a plane 30 which engages with an end plane 1b of the mirror. Part 3d which is so bent to inside as engaging with corner parts 3c of the mirror is provided at forward end of the arm 3n.

What are shown as 3c are four mirror pressing arms extending from the base part 3m toward the bend parts 3b, 3b', and have elasticity being somewhat warped upward.

When a mirror is attached to the supporting plate 3, forward ends of the arms 3n and the arms 3c are opened resisting the resiliency thereof, and the mirror 1 is pushed thereinto toward the direction of an arrow 10 until the forward end 1b comes into contact with the contacting plane 30. Then the mirror 1 is retained in place in such manner as being unable to be dislocated, being sandwiched between the plane 30 of the supporting plate 3 and the bent parts 3d, and at the same time the mirror is pushed from its reverse plane by the resilient arms 3c, so that the reflective plane 1a thereof is pressure contacted with the defining planes 3p, 3p' of the bent parts 3b, 3b' is retained at a constant position against the axle holes 3a. The contacting planes of the forward ends of the resilient arms 3c and the reverse plane of the mirror 1 may be cemented using a small amount of adhesives so that the dislocation or shifting of the mirror by shock at a time of movement is prevented. In this case since each arm independently has flexibility, there will be no fear of deformation, etc. of the mirror. When the supporting body 3 is built in a camera engaging parts 3k at the bottom planes of its arms 3n engage with the stopping member 2 within a camera. Therefore, when the relative positions of the axle holes 3a of the supporting body 3, the defining planes 3p, 3p' and the engaging parts 3k are precisely and accurately made in fabrication thereof, even if there are irregularity in the thickness of the mirror 1 or errors in its parallelness, the position of the reflective plane of the mirror will not be placed out of order.

What is claimed is:

1. In a single lens reflex camera having a reflex lens system including a rotatable mirror and a support therefor angularly positioned in the light path in said camera, said rotatable mirror support arranged for positively maintaining said angular position and comprising:

(a) a support base having a plurality of individual resilient support members for supporting the mirror when placed thereon,
(b) arms on opposite sides of said base having flexible end portions for positioning said mirror on said base in a predetermined position relative to said light path at one extremity of said arm and stop means at the other extremity for limiting the travel of said mirror when positioned on said support,
(c) axle support means carried by said arms at one of said extremities and forming an integral part thereof for maintaining the fixed rotational position of said support base and mirror in the reflective plane of said mirror,
(d) adhesive means attached to said support members for adhering said mirror when placed thereon for movement with said resilient members, said support base and flexible arms being disposed to carry said mirror in fixed angular relation for said light path and being disposed to flexibly position said mirror on said support base for maintaining the fixed angular light path in response to the deterioration of support parts and wear and tear of camera parts related to use and environmental conditions.

2. In a single lens reflex camera according to claim 1 wherein said resilient members are depending members individually positioned for conveniently placing the mirror in a plurality of angular positions relative to said support base and the light path.

3. A movable mirror device for a single lens reflex camera including a support frame for rotatably supporting said mirror, said frame comprising:
(a) a base support,
(b) a positioning arm means forming an integral part of said base support for engaging the reflecting surface of the mirror and defining the position of the said mirror,
(c) axle bearing support carried by said positioning means to maintain a fixed rotational position of the support and mirror in the reflective plane of the mirror,
(d) elastic mirror pushing arms formed in unity with said base support for positioning the back side of the mirror and causing the reflecting surface to contact said arm means, and
(e) engaging means forming a part of said base support for further positioning said mirror.

* * * * *